United States Patent [19]

Ernstoff et al.

[11] 4,205,428
[45] Jun. 3, 1980

[54] PLANAR LIQUID CRYSTAL MATRIX ARRAY CHIP

[75] Inventors: Michael N. Ernstoff, Los Angeles; Gordon F. Anderson, Huntington Beach, both of Calif.

[73] Assignee: The United States of America as represented by the Secretary of the Air Force, Washington, D.C.

[21] Appl. No.: 880,812

[22] Filed: Feb. 23, 1978

[51] Int. Cl.$^2$ ................................................ H01S 4/00
[52] U.S. Cl. ................................... 29/592 R; 204/15; 204/24
[58] Field of Search ............. 29/592 R; 350/330, 336, 350/339, 340, 341; 204/15, 24

[56] References Cited

U.S. PATENT DOCUMENTS

| | | |
|---|---|---|
| 3,192,135 | 6/1965 | Robbins ................................. 204/24 |
| 3,562,117 | 2/1971 | Vander May ........................ 204/24 |
| 3,891,514 | 6/1975 | Klemm ................................. 204/15 |
| 3,913,223 | 10/1975 | Gigoux ................................. 204/15 |
| 3,966,302 | 6/1976 | Mikoda et al. ....................... 29/592 |
| 3,987,226 | 10/1976 | Yasar ................................... 204/15 |

*Primary Examiner*—Lowell A. Larson
*Attorney, Agent, or Firm*—Joseph E. Rusz; Henry S. Miller

[57] ABSTRACT

A process for forming planar liquid crystal matrix array chips including the steps of electro-plating a conductive material over a smoothing layer thereby filling the contact holes with conductive material or alternatively placing a photoresist over the micro circuit, electroplating over the photo resist, which is then dissolved leaving conductive posts. The smoothing material is applied around the posts and the surface then polished, made flat and reflecting electrodes attached.

2 Claims, 9 Drawing Figures

PLANAR LIQUID CRYSTAL MATRIX ARRAY CHIP

STATEMENT OF GOVERNMENT INTEREST

The invention described herein may be manufactured and used by or for the Government for governmental purposes without the payment of any royalty thereon.

BACKGROUND OF THE INVENTION

This invention relates generally to liquid crystal displays (LCD's) and more specifically to a means for reducing unwanted scattered light and increasing the contrast in such displays.

A liquid crystal display generally consists of a film of liquid crystals (a substance which exists at a state between liquid and crystal) between two systems of electrodes. One electrode is transparent while the other reflects light. The reflective electrode consists of a plurality of integrated circuits mounted on a substrate material. Electrodes are electrically connected to each integrated circuit whereby selected portions of the reflecting electrode may be energized while other portions remain neutral.

When the integrated circuit becomes energized, the liquid crystal between the electrodes exhibits hydrodynamic turbulence and disperses light. The contrast between the dispersed light and the reflected light creates the figures of the display. The integrated circuit can also be used to energize a field effect liquid crystal material mode.

A foremost feature of the liquid crystal display is its ability to maintain high contrast under high ambient lighting conditions. The main factor limiting contrast in the LCD is light which is ramdomly scattered off steps in the semi-conductor wafer surface. Various methods and means have been advanced in an attempt to control light scattering, but thus far none of those provided have been able to eliminate the background scattering in the off state. A solution has been suggested which lowers light scattering by application of a smoothing layer within the crystal, thereby reducing the number of surfaces from which undesired light is reflected.

The smoothing layer, while improving the performance of the LCD continues to show indentations and other irregularities at the contact 'via' holes. These holes are areas where substrate is selectively etched to provide the required electrical contacts. Unless a method and means is provided for "filling" these indentations, the contrast ratio and the field-of-view will be limited.

SUMMARY OF THE INVENTION

This invention addresses the problem of providing a conductive, but hidden path, through the smoothing layer in an LCD. The concepts utilized in the solution involve the use of electroplating to deposit conductive material in the contact 'via' holes as well as the deposition of a dielectric material around a previously formed array of conductive posts.

The results of applying the techniques taught in this invention further increase the field-of-view over which a high contrast ratio can be obtained on a liquid crystal pictorial display. Contrast ratios of 25:1 are currently being observed on operating displays, when the illumination and viewing conditions are optimum. Under conditions that permit viewing over a wider range of angles, the contrast ratio degrades to 4:1 at most positions. Data measured using mock-ups of smoothed surfaces indicate that the application of a smoothing layer will make it possible to achieve contrast ratios of 25:1 over a typical range of viewing angles and 80:1, at optimum viewing angles. The methods and means taught in this invention will extend the viewing angle range over which these very high contrast ratios can be achieved to those typically encountered in a direct view display.

While a very significant increase in contrast ratio is obtained by applying a smoothing layer, all background scattering is not eliminated due to irregularities created by the contact "via" holes and the edges of the defined electrodes. Experience has shown, however, that surface undulations caused by electrode edges cause insignificant scattering which is substantially lower than the background scattering level of the liquid crystal material.

Planar semiconductor chips for the liquid crystal pictorial display are well known and produced with standard manufacturing techniques. Fundamentally, the display is built upon a basic wafer. This is true for both arrays of chips as well as individual chips. In the known process, holes are etched in the last dielectric material layer to permit the subsequently deposited reflective electrode to make electrical contact with the underlying conductive layer. These holes create dips in the surface of the reflected layer, thus scattering light and reducing contrast.

The problem is solved by filling the 'via' holes with an electroplate material or, alternatively establishing conductive pedestals prior to the deposition of the smoothing layer.

It is therefore an object of the invention to provide a new and improved method and means for improving the contrast in liquid crystal pictorial displays.

It is another object of the invention to provide new and improved liquid crystal pictorial display that provides higher contrast than any known like devices.

It is a further object of the invention to provide a new and improved liquid crystal pictorial display that will provide viewing over a wider range of angles than any known similar devices.

It is still another object of the invention to provide a new and improved liquid crystal pictorial display with an increased field-of-view at a high contrast ratio.

It is still a further object of the invention to provide a new and improved liquid crystal pictorial display that is low in cost and easily manufactured.

These and other advantages, features and objects of the invention will become more apparent from the following description taken in connection with the illustrative embodiment in the accompanying drawing.

DESCRIPTION OF THE PREFERRED EMBODIMENT

Figure 1:
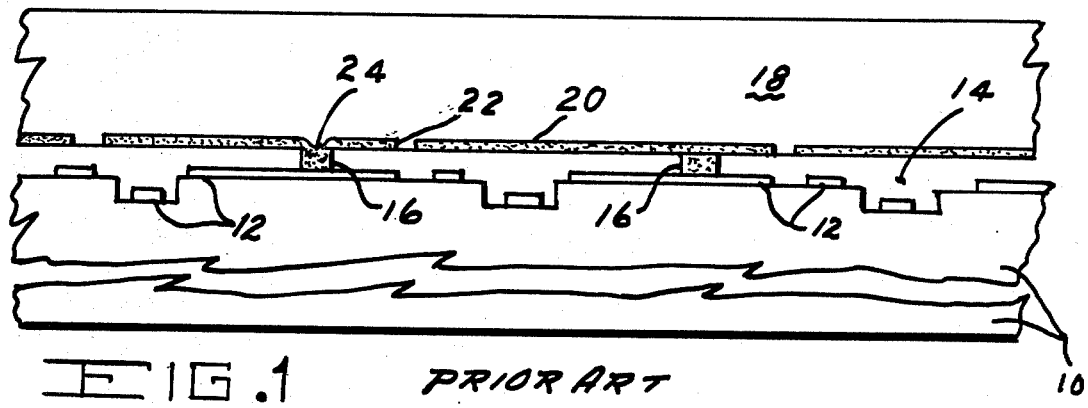
FIG. 1 is a cross sectional view of a prior art liquid crystal display cell.
Figure 2A:
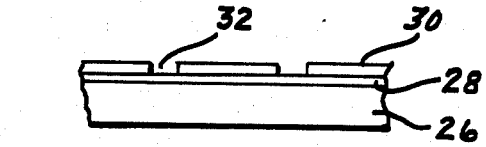
FIGS. 2A to 2D represent a series of steps describing the selective plating process of the invention.

Referring now to FIG. 1, there is shown a prior art display including a silicon substrate 10 having electronic circuitry 12 formed thereon with conventional metal-oxide semiconductor (MOS) processing techniques. A smoothing layer 14 of appropriate material is deposited over the circuitry and holes 16 are etched through the smoothing layer to allow for electrical connection between the circuitry and the reflecting electrode. A liquid crystal 18 is placed over the reflective electrode 20 to complete the liquid crystal display chip.

The area of difficulty in the prior art devices is located at the ends 22 of the reflective electrode 20 and at the "dimples" 24 in the electrode surface where the reflective electrode drops through the 'via' hole 16 to make contact with the circuitry 12. Light reflecting from areas 22 and 24 degrade the contrast ratio of the overall display substantially.

FIGS. 2 and 3 show methods and means for establishing contact between the circuitry 12 and the reflective electrode 20 eliminating the 'dimples' and thereby improving the contrast ratio. FIG. 2a shows a silicon base 26 having electrical circuits 28 formed on its surface and a coating of smoothing material 30 covering the surface. Holes 32 are formed in the soothing material by etching or other appropriate technique. In FIG. 26, a metal 34 is electroplated onto the wafer which fills the voids created by the holes 32. The wafer acts as a cathode in the electroplating process and thus junctions are forward biased. FIG. 2c discloses the wafer after excess electroplate has been polished off, thereby leaving the smoothing layer clean with holes (32) filled with conductive material 34. In FIG. 2d, the reflective electrodes 36 are applied to the smoothing layer 30 and the liquid crystal 38 is applied in a conventional fashion.

Figure 3A:
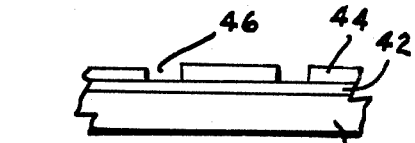
FIGS. 3A to 3D represent a series of steps describing the conductive pedestal process of the invention.
Figure 2B:
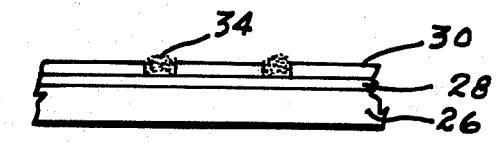
Figure 3B:
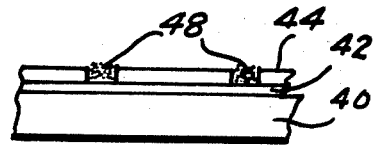
Figure 2C:
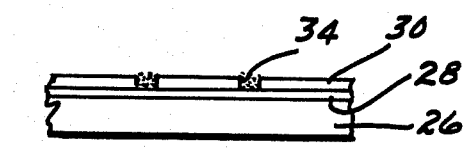

In FIG. 3a is shown a method and means for forming a conductive pedestal prior to the application of the smoothing coating. A silicon substrate 40, having electronic circuitry 42 positioned on one face is utilized and has a negative photo resist 44 deposited thereon. The photo resist is of a design that will permit the design of the necessary 'via' holes (46) to develop. In FIG. 36, a suitable metal has been electroplated through the photoresist. During the process, the wafer is treated as a cathode; hence, all diode junctions are forward biased permitting the free flow of plating current.

Figure 3C:
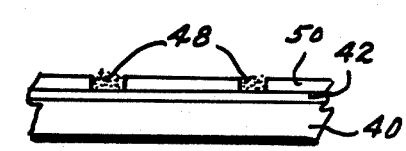
Figure 2D:
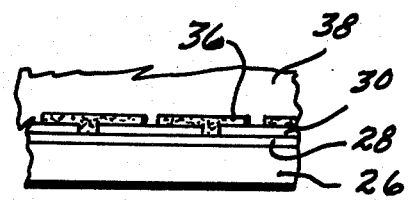
Figure 3D:
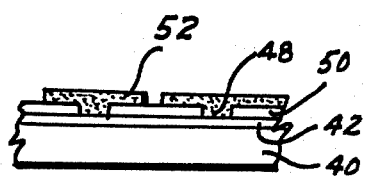

Once the plating has been completed, photoresist 44 is dissolved away and smoothing material 50, such as a polymide is applied around posts 48 as shown in FIG. 3c. The surface is then polished mechanically and the reflective electrode 52 connected to posts 48 and the liquid crystal positioned to form the display chip (FIG. 3d).

Although the invention has been described with reference to particular embodiment embodiments, it will be understood to those skilled in the art that the invention is capable of a variety of alternative embodiments within the spirit and scope of the appended claims.

We claim:

1. A method of forming liquid crystal pictorial display chips comprising the steps of: forming a selected micro circuit upon one surface of a silicon substrate; applying a coating smoothing material over the micro circuit: forming openings in said smoothing material for attachment of electrical contacts to the said circuitry; electroplating a layer of conductive material over the openings in the smoothing material; removing the excess electroplated material from the surface of the smoothing material by polishing; connecting reflective electrodes to the remaining electroplated material, and placing a liquid crystal over the reflective electrode.

2. A method for forming liquid crystal pictorial display chips comprising the steps of: forming a selected microcircuit upon one surface of a silicon substrate; depositing a negative photo resist over said microcircuit; developing the photo resist in a selected pattern; electroplating a conductive material over the photo resist; dissolving away the photo resist; applying a coating of smoothing material over the micro circuit; polishing the surface of the smoothing material and remaining electroplated material whereby the surface is flat; applying reflective electrodes to the smooth surface and connecting to the electroplated materials, and placing a liquid crystal over the reflective electrode.

* * * * *